M. M. McINTYRE.
VEHICLE SPRING.
APPLICATION FILED JUNE 3, 1907.
Reissued Feb. 17, 1914.
13,689.
2 SHEETS—SHEET 1.
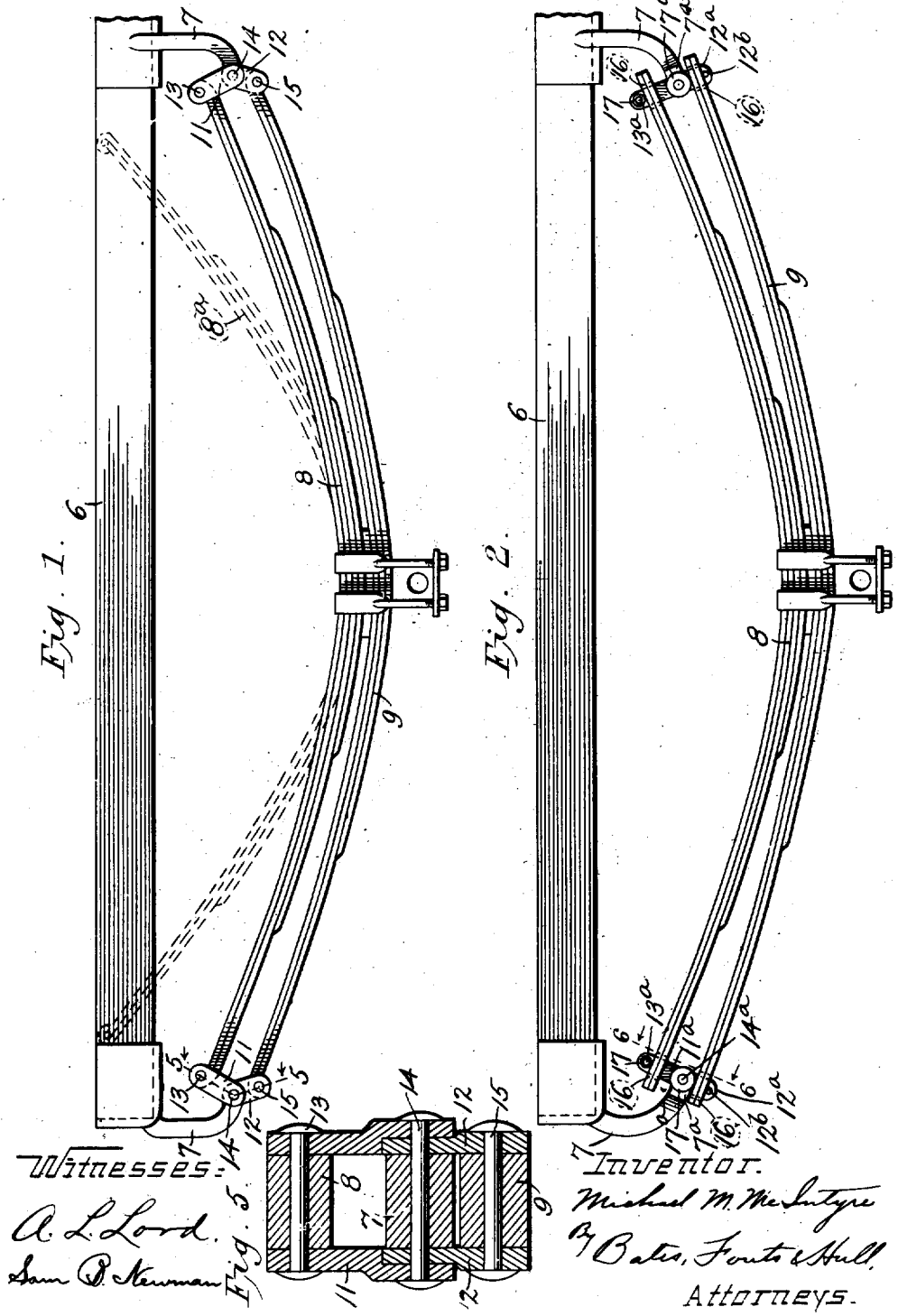
Witnesses:
A. L. Lord.
Sam P. Newman
Inventor.
Michael M. McIntyre
By Bates, Fonte & Hull,
Attorneys.

M. M. McINTYRE.
VEHICLE SPRING.
APPLICATION FILED JUNE 3, 1907.
Reissued Feb. 17, 1914.
13,689.
2 SHEETS—SHEET 2.
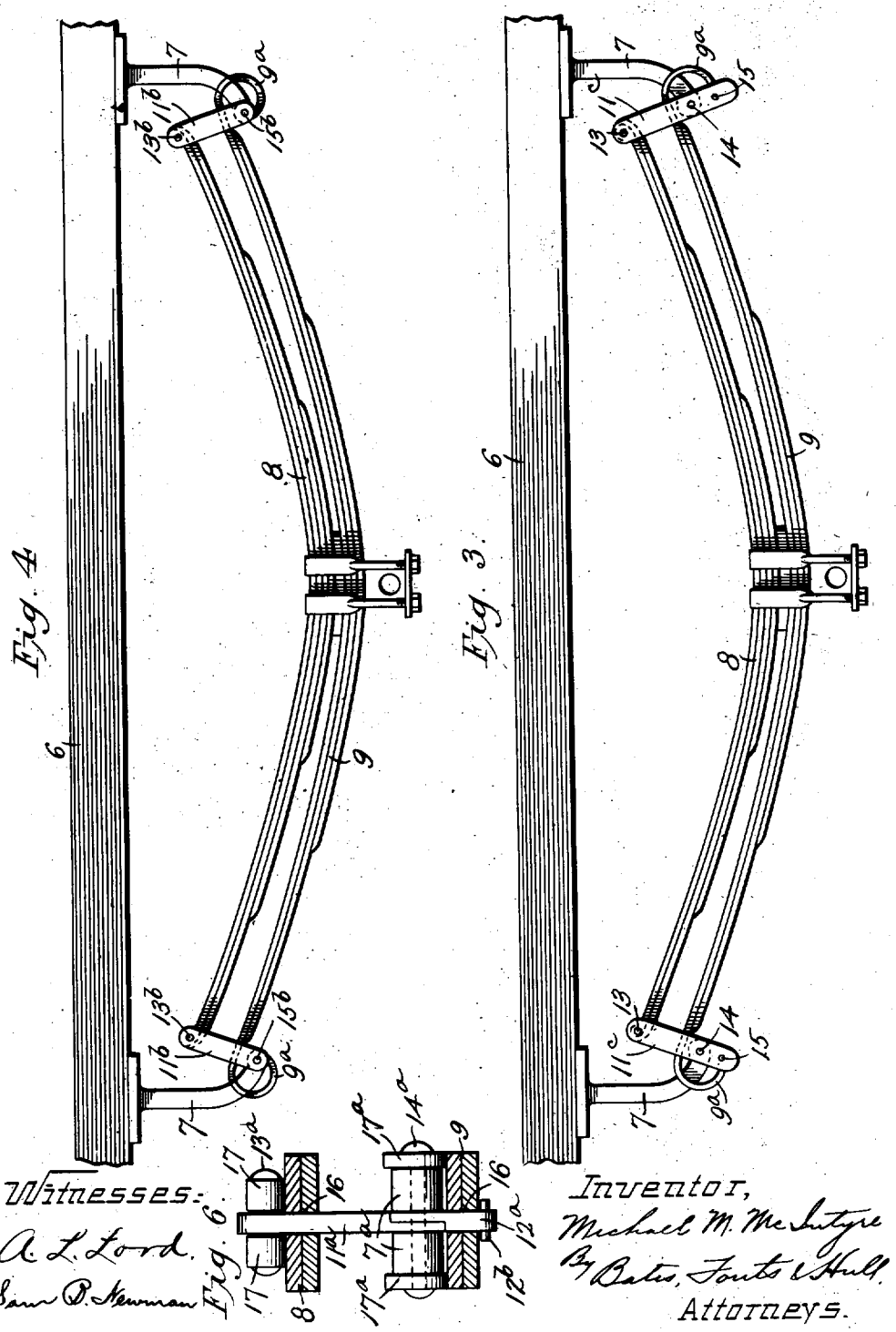
Witnesses:
A. L. Lord.
Sam P. Newman
Inventor,
Michael M. McIntyre
By Bates, Fouts & Hull,
Attorneys.

UNITED STATES PATENT OFFICE.

MICHAEL M. McINTYRE, OF CLEVELAND, OHIO, ASSIGNOR TO THE PERFECTION SPRING COMPANY, OF CLEVELAND, OHIO, A CORPORATION OF OHIO.

VEHICLE-SPRING.

13,689. Specification of Reissued Letters Patent. Reissued Feb. 17, 1914.

Original No. 791,714, dated June 6, 1905, Serial No. 223,402. Application for reissue filed June 3, 1907. Serial No. 377,122.

*To all whom it may concern:*

Be it known that I, MICHAEL M. McINTYRE, a citizen of the United States, residing at Cleveland, in the county of Cuyahoga and State of Ohio, have invented a certain new and useful Improvement in Vehicle-Springs, of which the following is a full, clear, and exact description, reference being had to the accompanying drawings.

This invention relates to vehicle springs which are suitable for carriages, wagons and automobiles; and it is characterized by the employment, for a complete spring, of two spring sections, preferably of the leaf type; and the relative strength and construction of the sections and the manner of connecting them to the vehicle are such that, when so connected, one section supports, unaided, the normal unloaded weight of the vehicle and the other section comes into action as soon as any load is applied to the vehicle and assists the former section in supporting the load thus placed on the vehicle.

The object and result of this construction are to give a better and easier movement to the vehicle alike when empty and when subjected to light or heavy loads.

Various forms of the invention are illustrated in the accompanying drawings, Figures 1, 2, 3 and 4 being, respectively, elevations of different forms, all however, embodying the double-spring idea referred to. Figs. 5 and 6 are details in section on the lines 5—5 and 6—6 of Figs. 1 and 2, respectively.

Referring specifically to the drawings, 6 indicates the frame of the vehicle, to which are secured in a suitable manner the outriders or supporting arms 7. The upper spring section, which will be designated for convenience of description the "carrier spring", is indicated at 8 and the lower spring section or "load spring" at 9, the spring sections being of the leaf type and fastened together at the middle by clips, in an ordinary manner. The spring sections are connected at both ends to the arms 7. The tension of the section 8 is such that it supports, when in the position shown in full lines in the drawings, the normal unloaded weight of the vehicle body—that is, the spring section, if released, would rise to the position, say, indicated by the dotted lines $8^a$ in Fig. 1 of the drawings, but when connected to the supporting arm the weight of the vehicle body causes it to take the position shown in full lines. The normal position of the spring 9 is that shown in full lines in the drawings—that is, in the position shown in the drawings, it supports no weight, the weight of the vehicle, as stated above, being entirely sustained by the spring section 8. If, however, the vehicle be loaded, the weight of the load is taken partly by the spring section or "load spring" 9, or, in other words, the combined weight of the vehicle and load is taken by the two spring sections 8 and 9. The spring section 9, or "load spring", in all the modifications is provided with relatively long, flexible ends, and the strength and curvature of the spring sections are determined in advance, according to the weight of the vehicle body and the maximum load to be supported by the spring sections, so that when the sections are applied and connected to the vehicle, the weight of the vehicle body will cause the "carrier spring" to bend to the extent required for the attachment of the arm 7 to the "load spring" 9 without the necessity for deflecting the latter. The attachment of the spring sections will be effected in various ways, as shown in the drawings.

In Fig. 1, the spring sections have their ends curled to form eyes, the ends of the upper spring section being curled upwardly and the ends of the lower spring section being curled downwardly, and the arms 7 are connected by shackle links 11 and 12 to the adjacent ends of spring sections 8 and 9, by means of pins 13, 14 and 15, pins 13 extending through the upper ends of shackle links 11 and the eyes of spring section 8, pins 14 extending through the lower ends of the supporting arm 7 and the pivotally supported ends of shackle links 11 and 12 and the pins 15 extending through the lower ends of shackle links 12 and the eyes of spring section 9. Double links or shackles are used, as clearly shown in the sectional view, Fig. 5.

In the form shown in Fig. 2, the ends of the spring sections are left plain or flat and are slotted, as at 16, within and adjacent to the extreme ends thereof. Single links are used (indicated respectively at $11^a$ and $12^a$). These links extend through the slots in the end portions of the spring sections and each link is provided with rollers 17, 17[a], which bear on top of the respective spring sections. The rollers are carried by pins 13[a], 14[a], the latter pin also serving to connect the supporting arm 7 with the links, the eye of the supporting arm being forked as indicated at 7[a], Fig. 6, to receive therebetween the upper end of link 12[a] and the lower end of link 11[a], the adjacent ends of the links being halved and lapped where the pin extends through them between the forks of the supporting arm, as clearly shown in Fig. 6. This construction is decidedly advantageous and allows a free and easy movement of the ends of the spring sections. Under ordinary slow movements of the spring ends, the rollers and links move together, the links occupying the same portions of the slots throughout the movements. Under sudden and severe shocks or blows, the rollers permit the ends of the spring sections to move relatively to the links, and a free and easy movement of the spring ends is thus provided under all conditions of use. A stop pin 12[b] is inserted in the lower end of the link 12[a] to hold the same in proper relation to the spring section 9.

The forms of spring shown in Figs. 1 and 2, having both ends flexibly connected to the supporting arms, are adapted for use as rear springs of vehicles having radius rods.

In Fig. 3, the upper and lower spring sections 8 and 9 are connected to the supporting arms 7 by means of levers 11[c], which are pivoted intermediate of their ends to said supporting arms 7 by the pins 14. The ends of spring section 8 are connected to the upper ends of these levers by means of pins 13, and the ends of the spring section 9 are provided with scrolls 9[a] which extend downwardly and are connected to the lower ends of the levers by pins 15.

In Fig. 4, the scroll ends of the spring section 9 are shown as connected to the pins 15[b] by means of which the links 11[b] are connected to the arms 7 and the ends of the upper spring section 8 are connected by pins 13[b] to the upper ends of said links.

It will be noted that, in all of the modifications of my invention disclosed herein, the lower or "load spring" 9 is lighter than the upper or "carrier spring" 8 and has long flexible ends, said ends being provided by the absence of reinforcement for the upper pair of plates for a considerable portion of their length.

The double springs herein described secure ease of riding under all conditions of the vehicle, whether it be empty or whether it be under light or heavy loads.

Having described my invention, I claim:

1. The combination, with a vehicle frame, of two leaf-spring sections secured together at their body portions and having their ends flexibly connected together and connected to said frame, one of said sections being of greater strength than the other and said sections being so shaped and proportioned that, when connected together and to the unloaded vehicle, the section which is of greater strength supports the normal unloaded weight of the vehicle and the section which is of lesser strength is active, substantially immediately upon subjecting the vehicle to load, to assist the former section to carry such load, substantially as specified.

2. The combination, with a vehicle frame, of two leaf-spring sections secured together at their body portions and flexibly connected to the vehicle at their ends, one of said sections having long flexible ends and being of less strength than the other and said sections being so shaped, proportioned, and connected to the vehicle that the section which is of greater strength supports the normal unloaded weight of the vehicle and the section which is of less strength is active, substantially immediately upon subjecting the vehicle to load, to assist the stronger section to carry such load, substantially as specified.

3. The combination, with the frame of a vehicle, of a pair of spring sections connected together to form a unitary spring, and flexible connections supported by said frame and extending in opposite directions and connected to the said spring sections, substantially as specified.

4. The combination, with the frame of a vehicle, of a pair of spring sections connected to form a unitary spring, and flexible connections supported by said frame and extending in opposite directions from their common point of support and connected to the said spring sections, substantially as specified.

5. The combination, with the frame of a vehicle, of a supporting arm carried by said frame, a pair of spring sections connected together to form a unitary spring structure, and a pair of links projecting in opposite directions from said arm and connected to the adjacent ends of said sections, substantially as specified.

6. The combination, with the frame of a vehicle, of a pair of spring sections connected together at their body portions, arms carried by said frame, and links extending in opposite directions from said arms and connected to said spring sections, substantially as specified.

7. The combination, with the frame of a vehicle, of a supporting arm carried thereby, a pair of spring sections clamped together to form a unitary spring structure, a link extending upwardly from said arm and connected to an end of one of said sections, and a link extending downwardly from said arm and connected to an end of the other spring section, substantially as specified.

8. The combination, with the frame of a vehicle, of two spring sections secured together at their body portions, each of said sections being provided with slotted ends, supporting arms carried by said frame, links carried by said arms and extending through the slots in the ends of the spring sections, and a roller carried by each link and bearing upon a section, substantially as specified.

9. The combination, with the frame of a vehicle, of a supporting arm carried by said frame, a link carried by said arm and provided with a roller, and a spring having an end portion thereof engaging said roller, substantially as specified.

10. The combination with the frame of a vehicle, of an arm carried by said frame, rollers carried by said arm, and a pair of spring sections secured together at their body portions, each of said sections having a portion engaging a roller, substantially as specified.

11. The combination with the frame of a vehicle, a link carried by said frame, a roller carried by said link, and a spring having adjacent to the end thereof a slot for the reception of said link, substantially as specified.

12. The combination, with the frame of a vehicle, of a link carried thereby, a roller carried by said link, and a spring having an end portion engaging said roller, substantially as specified.

13. The combination, with the frame of a vehicle, of supporting arms carried by said frame, links carried by said arms, a roller carried by each of said links, and a spring having its opposite ends engaging said rollers, substantially as specified.

14. The combination, with the frame of a vehicle, of an arm carried by said frame, links projecting respectively above and below said arm and each having a roller, and a pair of spring sections secured together at their body portions, the adjacent ends of said sections engaging said rollers, substantially as specified.

15. The combination, with the frame of a vehicle, of an arm carried by said frame, a pair of links connected to said arm and extending respectively above and below the same, a roller carried by the upper link, a roller supported by the arm at the upper end of the lower link, and a spring comprising a pair of spring sections connected together at their body portions, the adjacent ends of said sections engaging said rollers, substantially as specified.

16. The combination with two leaf-spring sections secured together at the middle and having slotted ends, of links extending through the slots and provided with rollers bearing upon each section, and attaching arms connected to the links.

In testimony whereof I have signed my name at Cleveland, Ohio, to this specification in the presence of two subscribing witnesses.

MICHAEL M. McINTYRE.

Witnesses:
J. B. HULL,
W. S. RINGLE.